United States Patent
Dolata et al.

[11] 3,921,490
[45] Nov. 25, 1975

[54] SAW CHAIN FOR MOTOR CHAIN SAWS

[75] Inventors: Hans Dolata, Neustadt; Rolf Sauermilch, Waiblingen, both of Germany

[73] Assignee: Andreas Stihl Maschinenfabrik, Neustadt, Germany

[22] Filed: Jan. 30, 1973

[21] Appl. No.: 328,125

[52] U.S. Cl. .................................. 83/833; 83/834
[51] Int. Cl.² .................................... B27B 33/14
[58] Field of Search ............ 83/831, 830, 832, 834, 83/833, 174; 30/381, 382, 383, 384, 138

[56] References Cited
UNITED STATES PATENTS

| | | | |
|---|---|---|---|
| 3,180,378 | 4/1965 | Carlton | 83/834 |
| 3,260,287 | 7/1966 | Oehrli | 30/138 |
| 3,263,717 | 8/1966 | Silvon | 83/834 |
| 3,596,689 | 8/1971 | Oehrli | 30/138 |

*Primary Examiner*—Donald R. Schran
*Attorney, Agent, or Firm*—Walter Becker

[57] ABSTRACT

A cutting saw chain having cutting tooth links distributed therealong. Each cutting tooth link having a portion at one end upstanding therefrom and twisted out of the plane of the link to form a cutting edge. The links on opposite sides of the chain have the upstanding portions twisted in opposite directions. Each cutting tooth link at the other end has a portion upstanding in the plane of the link and forming depth limiting means. A link in advance of each cutting tooth link also has an upstanding part forming a depth limiter for the following cutting tooth link.

12 Claims, 10 Drawing Figures

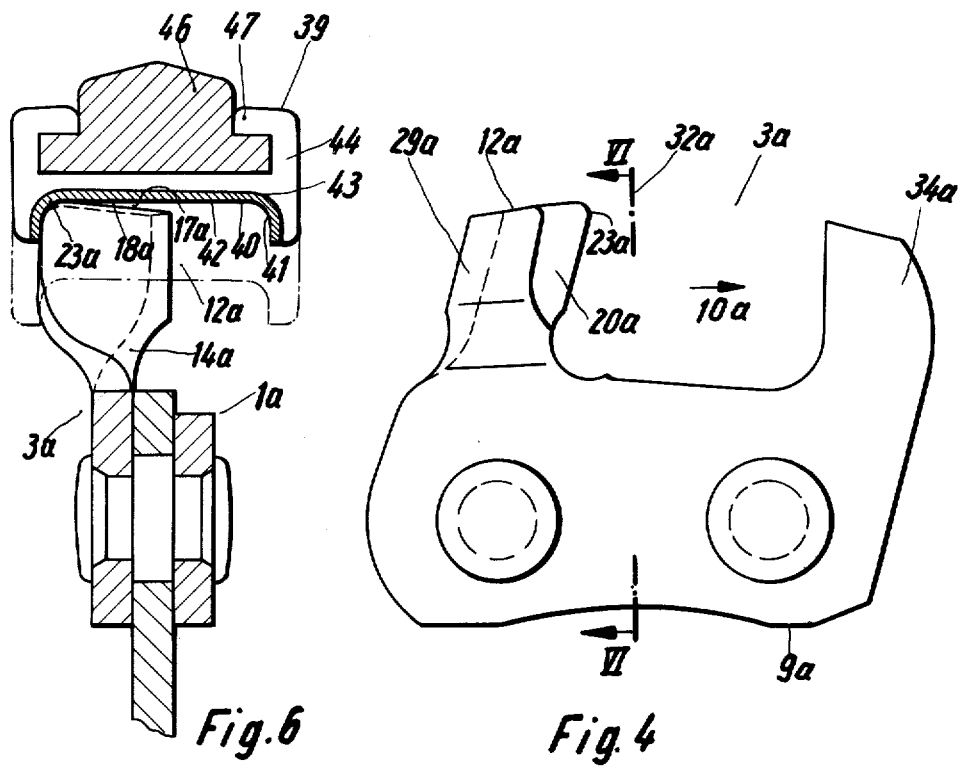
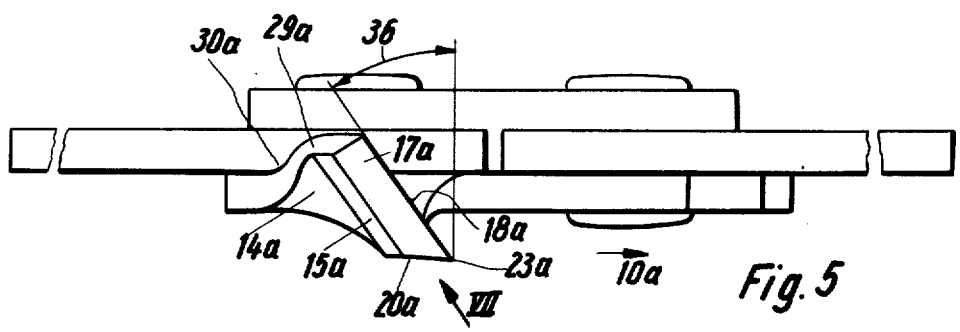

SAW CHAIN FOR MOTOR CHAIN SAWS

The present invention relates to a saw chain for motor chain saws with lateral links and intermediate links pivotally interconnecting the lateral links while some links form cutting tooth links the cutting teeth of which are respectively formed by a portion of the link body, this link body portion being twisted or set about an axis which is transverse to the cutting direction and is approximately parallel to the plane of the link body while being inclined forwardly in the cutting direction in such a way that a transverse cutting edge is formed which comprises a cutting edge back surface formed by the longitudinal edge of the set link body portion and also comprises a steeply inclined cutting edge face surface which if formed by an outer surface of the set link body portion. Furthermore, when viewing in cutting direction, at least approximately in front of each transverse cutting edge there is provided a lateral cutting edge which extends to the pertaining outermost cutting plane of the saw chain.

A heretofore known saw chain according to which the lateral cutting edges are provided on separate tooth links in front of the set cutting tooth links has the drawback that four different cutting links are required and that in view of the specific design of the cutting links these cutting links will become dull or worn after a short working period. Furthermore, with this saw chain it is necessary to post-work, for instance by filing, the face of the cutting edge after the face of the cutting edge has been post-ground approximately from three to five times. A further drawback of this heretofore known saw chain is seen in the fact that the length of the cutting teeth or the height thereof of approximately 2.5 mm is extremely short so that already after a few post-grinding operations this saw chain will be totally unusable.

It is, therefore, an object of the present invention to provide a saw chain of the above mentioned general character which in spite of a simple construction and in spite of the possibility that it can easily be post-ground will have a long life.

This object and other objects and advantages of the invention will appear more clearly from the following specification in connection with the accompanying drawings, in which:

FIG. 4 represents a side view of a slightly modified embodiment of a cutting tooth link according to the invention.

FIG. 5 is a top view of the tooth link shown in FIG. 4.

FIG. 6 is a section taken along the line VI — VI of FIG. 4 but shows further chain links of the saw chain and also shows a sharpening device.

Figure 1:
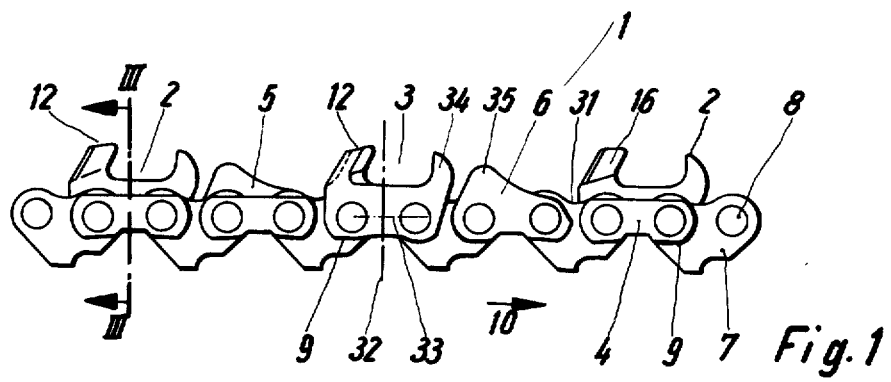
FIG. 1 illustrates a side view of a portion of a saw chain according to the invention.

The saw chain according to the present invention which is of the above described general character is characterized primarily in that the lateral cutting edge is formed by the pertaining set link body portion which, when viewed in cutting direction, extends to the pertaining outermost cutting plane of the saw chain. Advantageously, the transition section extending to the outermost pertaining cutting plane is rounded between the cutting edge back surface and the lateral surface so that the danger of injuries, for instance when mounting and assembling the saw chain, is practically eliminated. Expediently, the rounded transition section forms a part of a circle, especially is rounded over more than a quarter of a circle, so that in this region a distribution of the cutting load over a relatively large cutting edge length will be obtained. The transition section may, however, also be designed with a sharp angle and/or may be formed by an inclined surface in which instance it preferably forms a lateral cutting edge tip located in the pertaining outermost cutting plane.

For purposes of stabilizing the saw chain during the cutting operation, it is expedient that the transverse cutting edge extends from the lateral cutting edge in a direction counter to the cutting direction and rearwardly toward the longitudinal central plane of the saw chain.

Advantageously, that end of the transverse cutting edge which is located opposite to the lateral cutting edge protrudes slightly beyond the longitudinal central plane of the saw chain so that the cutting force to be exerted by the individual cutting teeth is relatively small.

For additionally improving the cut, the lateral edge of the set link body portion which pertains to the lateral cutting edge is relative to the pertaining outermost cutting plane of the saw chain provided with a clearing angle. Expediently, also the lateral edge of the set link body portion which lateral edge pertains to the lateral cutting edge is, when viewed in cutting direction, so located at an angle with regard to the laterally outermost cutting plane of the saw chain that the rounded transition section or lateral cutting edge engages the work piece to be cut only up to the lateral outermost portion.

According to a further development of the invention, the transverse cutting edge, when viewing in the cutting direction, is convexly curved while preferably that portion where the lateral cutting edge and the transverse cutting edge meet is spaced farthest from the guiding plane of the cutting edge link so that a still better stabilization of the saw chain will be obtained during its cutting action. The transverse cutting edge may, however, also advantageously be straight.

It is particularly advantageous in connection with the present invention to form the cutting edge links by lateral links of the saw chain which are located alternately on both sides of the saw chain and the cutting teeth of which respectively extend to the outermost cutting plane of the saw chain on the same side so that in spite of frequent post-grinding the wear of the cutting tooth links will be relatively low.

According to a further feature of the invention, the cutting tooth is at least within the region of the transverse cutting edge designed plate-like and plane in such a way that the set section is spaced from the transverse cutting edge so that also between the transverse cutting edge and the set section a plate-like post-grinding section is obtained and that after each post-grinding the same cutting shape will be realized.

Figure 2:
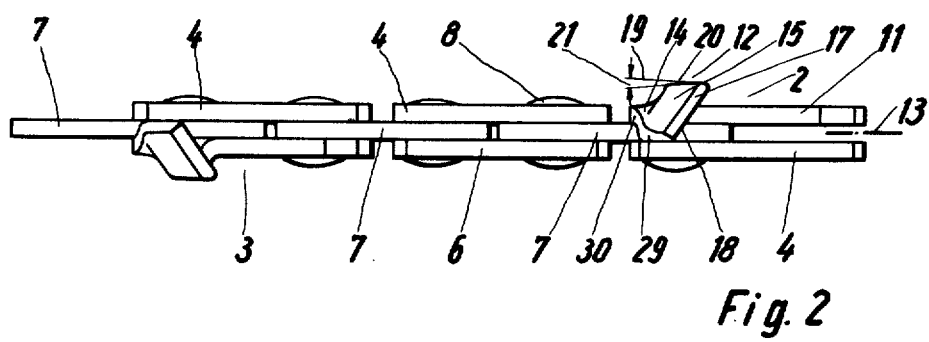
FIG. 2 represents a top view of the saw chain of FIG. 1.
Figure 3:
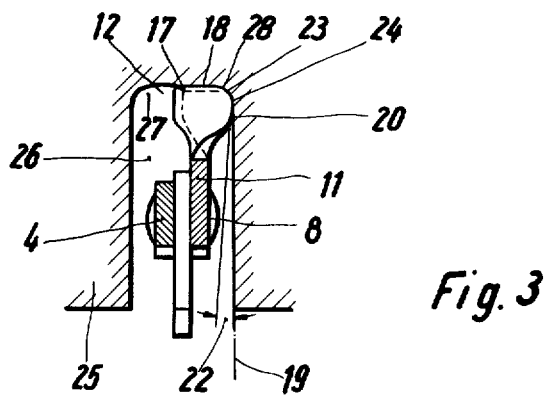
FIG. 3 is a section taken along the line III — III of FIG. 1.
Figure 7:
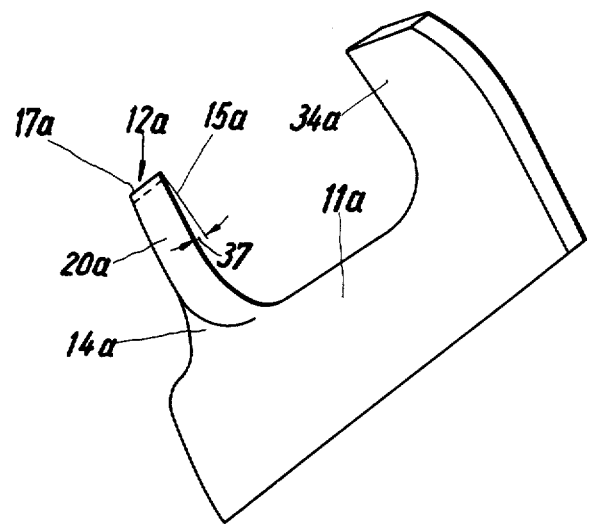
FIG. 7 is a view of FIG. 5 as seen in the direction of the arrow VII of FIG. 5.
Figure 8:
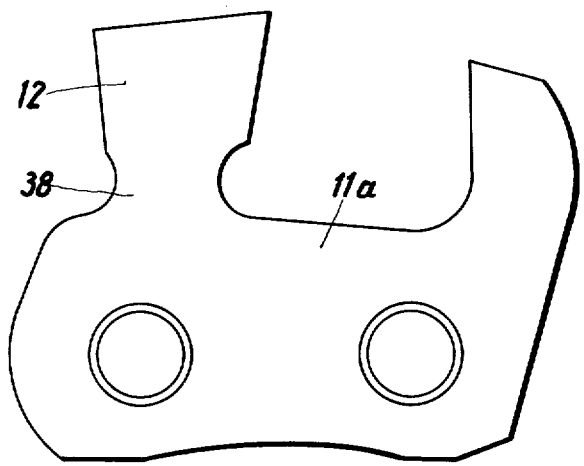
FIG. 8 illustrates the cutting tooth link according to FIGS. 4 – 7, prior to the setting of the cutting tooth.

Referring now to the drawings in detail, FIGS. 1 to 3 illustrate a saw chain 1 according to the invention which comprises individual chain links 2–7 linked to each other by means of chain bolts 8. The chain is formed by two respectively oppositely located lateral links 2–6 and intermediate links 7 interconnecting the lateral links 2–6. The intermediate links 7 serve for guiding the saw chain in the groove of a not illustrated guiding rail of a motor chain saw and protrude beyond the lateral links 2–6. The lateral links 2–6 have those sides thereof on which the intermediate links protrude provided with so-called broaching extensions (Räumansätze) as guiding surfaces 9 for guiding on the edge of the guiding rail adjacent to the groove. The guiding surfaces 9 form in stretched out condition of the saw chain according to FIG. 1 the guiding plane for the saw chain.

The saw chain 1 has cutting tooth links which are formed by lateral links 2, 3 and in the cutting direction of the saw chain indicated by the arrow 10 are located one behind the other. The cutting tooth links 2, 3 are located alternately on both sides of the chain, while transverse to the longitudinal direction of the chain indicated by the arrow 10 and adjacent to each cutting tooth link 2, 3 there is provided a lateral link 4 forming a connecting link. Each two successive cutting tooth links 2, 3 including the pertaining connecting links 4 are connected to each other by two intermediate links 7 which in their turn are between the cutting links 2, 3 interconnected by two lateral links 4, 5; 4, 6. One of these two lateral links each is formed by a depth limiting member 5, 6, whereas the other lateral link is formed by a connecting link 4. The depth limiting members 4, 6 are like-wise located alternately on both sides of the saw chain in such a way that in the cutting direction indicated by the arrow 10 ahead of each cutting tooth link 2, 3 and on the same side of the saw chain 1 there is provided a depth limiting member 5, 6.

Each cutting tooth link 2, 3 has that side of the link body 11 which faces away from the guiding plane 9 and is provided with pertaining bores for the chain link bolts 8 provided with a cutting tooth 12. Tooth 12 is formed by a protruding link body part which is set about an axis which extends transverse to the cutting direction indicated by the arrow 10 and is approximately parallel to the longitudinal central plane 13 of the saw chain 1, the setting or twisting being effected relative to the link body 11 by distortion. The link body part is inclined forwardly in the cutting direction indicated by the arrow 10. The setting or twisting is effected by an angle of less than 90° so that the cutting tooth 12 is located in a plane which is inclined to the longitudinal central plane 13. The twisted section 14 is directly adjacent to the link bodies 11 provided over a portion of the height of the cutting tooth 12 so that the latter forms a plate-shaped end section 15 which forms the cutting tooth proper. The plate-shaped plane end section 15 together with the front surface 16 which prior to the twisting of the tooth 12 is located on the inside of the cutting tooth element 2 forms a cutting face surface. The end edge 17 facing away from the guiding plane 9 and pertaining to the plate-shaped section 15 forms a cut back surface, and the two surfaces 16 and 17 form a transverse cutting edge 18. The plate-shaped section 15 of the cutting tooth 12 extends to the outermost cutting plane 19 of the saw chain and inwardly to approximately the plane in which the inner surface of the oppositely located lateral links are located so that the transverse cutting edge 18 extends slightly inwardly beyond the longitudinal central plane 13 of the saw chain and, more specifically, the plate-shaped section 15 of tooth 12 extends to the outermost cutting plane 19 located on the same side of the saw chain 1 as the pertaining cutting link 2, 3. The described design yields cutting tooth links 2, 3 alternately set toward the left and toward the right and alternately located on both sides of the saw chain. The cutting widths of the links 2, 3 slightly overlap each other within the region of the longitudinal plane 13 of the saw chain. The lateral outer side surface 20 of the plate-shaped cutting tooth section 15 is located at a clearing angle 21 with regard to the longitudinal central plane 13 or with regard to the laterally outermost cutting plane 19 of the saw chain 1 and similar to the side surface 20 in front view according to FIG. 3 forms an angle 22 with the plane 19. The transition section 23 from the cutting edge back surface 17 to the outer side surface 20 is rounded over a quarter of a circle so that the plate-shaped cutting tooth section 15 will during its cutting operation come into engagement with the work piece 25 to be cut laterally only up to that area 24 of the rounded transition section 23 which is located laterally farest outside.

FIG. 3 illustrates the cutting gap 26 which is produced in the work piece by the saw chain according to FIGS. 1–3. After the setting or twisting of the cutting tooth 12, prior to or after the assembly of the cutting tooth links 2, 3 on the saw chain, merely the cutting edge back surface 17 and the lateral surfaces 20 are machined, for instance by grinding, whereupon for purposes of post-sharpening the saw chain, merely a post-grinding or similar post-sharpening of the cutting edge back surface 17 is necessary. The rounded transition area 23 forms up to the area 24 a lateral cutting edge which in the cutting direction indicated by the arrow 10 is located primarily ahead of the pertaining transverse edge 18 and by means of which laterally at the bottom 27 of the cutting gap 26 the wood fibers are cut whereas in the intermediate range of the cutting gap bottom 27 of the wood is planed out or removed by the transverse cutting edges 18. The cutting edge 18 is, as shown in FIG. 3 and when viewed in cutting direction, of a slightly convexly outwardly curved contour. That area 28 of the cutting tooth 12 which area is located farthest from the guiding plane 9 of the saw chain is provided where the transverse cutting edge 18 and the rounded transition portion 23 meet.

The lateral surface 29 which faces away from the outer side surface 20 of the cutting tooth 12 is, as shown in particular in FIG. 2, S-curved within the region of the set section 14. The arc of curvature 30 which is curved inwardly with regard to the longitudinal plane 13 of the saw chain and directly merges with the link body 11 extends over the adjacent central link 7 on that edge 31 which faces away from the guiding plane 19 of the saw chain and does so within a region which is located in the cutting direction indicated by the arrow 10 in front of the center of the length of this central link 7. Inasmuch as the arc of curvature 30 is arranged in spaced relationship to the axis of the adjacent chain bolt 8 of the pertaining cutting tooth link 2, 3, its inner surface can with the edge 31 of the pertaining central link form an abutment which limits the pivoting of these two links relative to each other in the corresponding pivot direction.

As shown in FIG. 1, each cutting tooth 12 is located completely behind the bisectrix 32 of the connecting line 33 between the two joint axes of the pertaining links 2, 3, and in spaced relationship thereto. In front of the bisectrix 32, each cutting tooth link 2, 3 has a depth limiting member 34 which is spaced from the pertaining longitudinal bisectrix 32 by a distance greater than that of the pertaining cutting tooth 12. As a result thereof, the saw chain can in a simple manner during its rotation within the range of a deviation, for instance within the range of the driving sprocket of the motor chain saw, be post-sharpened while passing by a sharpening device. With a correspondingly profiled sharpening element or tool, each cutting edge back surface 17 together with the rounded transition area 23 will be post-sharpened up to the point 24. The post-sharpening can be effected until the plate-shaped cutting tooth portion 15 is completely worn off. Each depth limiting element 6 has a depth limiting member 35 which is located directly adjacent to the depth limiting member 34 of the pertaining trailing cutting tooth link 2, 3, in other words within the range of that end of the depth limiting element 6 which faces toward this cutting tooth link 2, 3. As a result thereof, a very favorable support and guiding of the saw chain in the cutting gap 26 will be assured.

In FIGS. 4 to 8 those elements which correspond to the same elements described in FIGS. 1 to 3 have been designated with the same reference numerals as in FIGS. 1 to 3 but with the affix a.

As shown in FIG. 5, the transverse cutting edge 18a is inclined at an angle 36 of approximately 125° relative to the cutting direction indicated by the arrow 10a and, more specifically, so that the rounded transition area 23a is in the cutting direction indicated by the arrow 10a located farthest in the front. The plate-shaped cutting tooth section 15a is inclined forwardly by an angle 37 of, for instance, from 10° to 60°. The cutting tooth link according to FIGS. 4–7 is made of a punched part according to FIG. 8 in which the ear 12' intended as cutting tooth is twisted or set into a position transverse to the running direction of the saw chain. The transition area 38 of the ear 12' in the link body 11a is narrowed relative to the ear 12' while circular recesses at the edges are formed whereby the described tooth shape following the setting operation is obtained.

As shown in FIG. 6, the saw chain, especially the cutting edge back surface 17 – 17a of each cutting tooth link during the rotation of the saw chain can be post-sharpened within the region of a chain deviation by means of a sharpening element or tool 39. The element or tool 39 has a working surface 40 which is curved about the axis for the reversing of the saw chain. The working surface 40 is, according to the axial section of FIG. 6, U-shaped with inner radii 41 which correspond to the rounded transition areas 23a of the cutting tooth 12a. Between the inner radii 41, the working surface 40 is within the region 42 designed cylindrical. Due to this design of the working surface 40 and in view of the inclination of the transverse cutting edge 18a relative to the cutting direction indicated by the arrow 10 there is obtained a slightly convex curvature of the transverse cutting edge 18a when viewed in cutting direction according to FIG. 6. The inner side of the working surface 40 may be selected of the same magnitude as the working width of the saw chain so that the right-hand as well as the left-hand cutting tooth links can be post-sharpened simultaneously within the region of their rounded transition areas. The working surface 40 may be formed by a layer of a grinding substance which is very thin and which is applied to a correspondingly profiled circular segment-shaped part 44 of synthetic material. This part 44 may be provided with positive elements 45, for instance, a dovetailed profile for detachable connection to a holder 46. Expediently, the part 44 is designed as disposable part which after having been used up can be exchanged for a new part.

Figure 9:
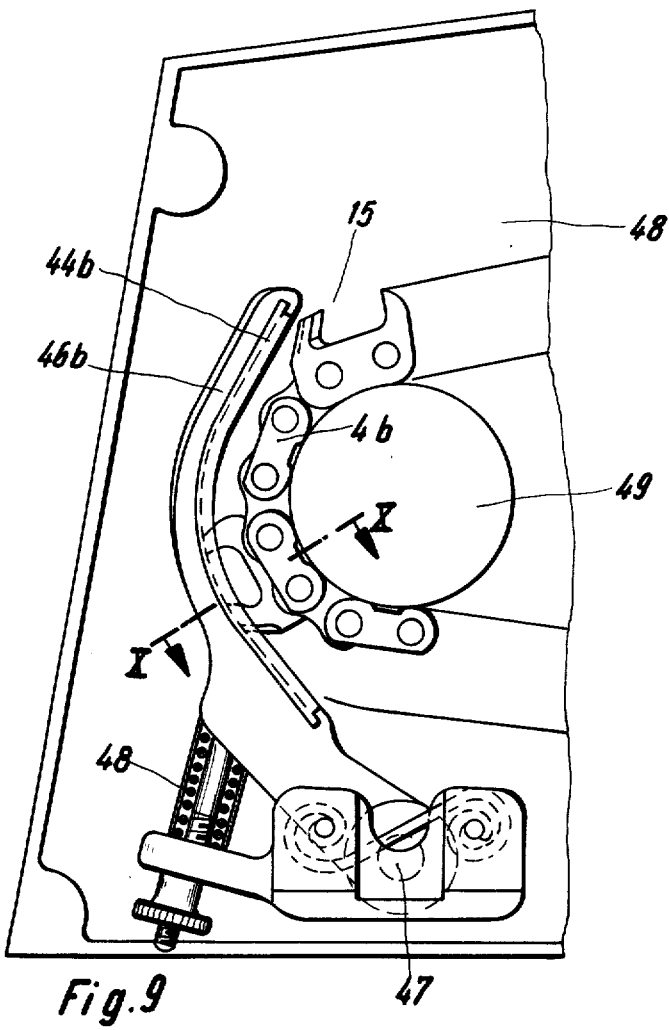
FIG. 9 illustrates a further embodiment of a saw chain according to the invention within the range of the driving chain sprocket of a motor chain saw with pertaining grinding device.
Figure 10:
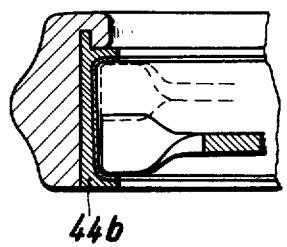
FIG. 10 is a section taken along the line X — X of FIG. 9.

In FIGS. 9 and 10 the same elements as described in the preceding figures have been designated with the same reference numerals as in FIGS. 1–9 but with the affix b added thereto relative to FIGS. 1–3 and with the affix c relative to FIGS. 4–8, but without the affix a.

According to FIGS. 9 and 10 the saw chain 1b differs from that of FIGS. 1 to 3 primarily in that no depth limiting elements 6 are provided but are replaced by connecting links 4b. The holder 46b for the grinding element 44b is formed by an arm which is pivotally journalled on the motor chain saw 48. This arm is spring-urged by a spring 48 in the direction toward the saw chain 1b so that the working surface of the sharpening element 44b engages in spring-urged condition those surfaces of the saw chain which are to be post-sharpened, the saw chain being guided within the region of the sharpening element 44b by the driving chain sprocket 49 of the motor chain saw. The sharpening element or tool 44b and the sharpening arm 46b are so designed that the sharpening element 44b can be inserted into the sharpening arm 46b in axis-parallel manner with regard to the driving chain sprocket 49 and can be detached therefrom in a corresponding manner.

The rounded transition areas 23 expediently have a radius of from 0.5 to 1 mm. Expediently, merely the face 16 of each cutting tooth 12 is hard chromed. Furthermore it is advantageous if the entire cutting tooth has a hardness of from 52 to 62 HRC. The width of each cutting tooth 12 may be with the illustrated embodiment expediently about 6 mm, while the cutting tooth stands away outwardly by approximately 2 mm and inwardly by approximately 1.4 mm.

Instead of the rounded transition area, also a sharp angled lateral cutting point may be provided so that merely the cutting edge back surface of the transverse cutting edge is to be post-sharpened, for instance, by means of a partially cylindrical grinding element.

Particularly in this instance, the cutting tooth could in its post-grinding region have a considerable hardness and thereby a long life inasmuch as the surface to be post-sharpened is relatively small. If in addition to this automatic post-sharpening also a post-sharpening by hand or a post-sharpening on the face of the cutting edge is intended, the hardness should be lower. The transverse cutting edge may also be straight in which instance its back surface may be approximately plane.

It is, of course, to be understood that the present invention is, by no means, limited to the specific showing in the drawings but also comprises any modifications within the scope of the appended claims.

What is claimed is:

1. A saw chain for motor chain saws having lateral links and intermediate links pivotally interconnected, some of said lateral links being designed as cutting tooth links, each said cutting tooth link comprising in combination a part upstanding therefrom generally parallel to the central plane of the chain and twisted about an axis transverse to the cutting direction and substantially parallel to the plane of the respective link, said upstanding part being inclined forwardly in the cutting direction, said upstanding part having an outer edge remote from the chain and a lateral edge which protrudes outwardly from the chain on the respective side of the chain and is disposed at an angle to said outer edge, said outer and lateral edges being joined by a curved transition region, said part rearwardly of said outer and lateral edges and said transition region being relieved to form sharp cutting edges on the leading side of said part, said lateral edge extending laterally of the saw chain to the respective side of the cut taken by said saw chain, and said outer edge being inclined from said transition region inwardly toward said central plane, said cutting edges permitting post-sharpening thereof automatically during rotation of chain saw operation.

2. A saw chain in combination according to claim 1 in which said outer cutting edge extends from the said lateral cutting edge inwardly toward the central plane of the chain and is inclined rearwardly with respect to the cutting direction of the chain, the end of said outer cutting edge remote from said lateral cutting edge protruding slightly beyond the longitudinal central plane of the saw chain.

3. A saw chain in combination according to claim 1 in which said cutting edge is convexly curved away from the chain.

4. A saw chain in combination according to claim 1 in which said outer cutting edge, when viewed in the cutting direction, is substantially linear and the relief formed on said part rearwardly of said outer edge is substantially planar.

5. A saw chain in combination according to claim 1 in which said cutting tooth links are arranged one behind the other in distributed relation along said chain and the said upstanding parts thereof are alternately twisted first in one direction for one cutting tooth link and the opposite direction for the cutting tooth link next adjacent thereto.

6. A saw chain in combination according to claim 1 in which said cutting tooth links are provided alternately on opposite sides of said chain in longitudinally distributed relation therealong with the upstanding part on each said cutting tooth link being twisted so as to diverge from the central plane of the chain in the cutting direction of the chain.

7. A saw chain in combination according to claim 1 in which the said upstanding part of each cutting tooth link is substantially planar with respect to the outer portion thereof and is connected to the inner portion of the link by a twisted section, each cutting tooth link when assembled in a chain being adjacent an intermediate link, said upstanding part being disposed at one end of the respective cutting tooth link and the said twisted section being disposed outwardly from the outer limits of the adjacent intermediate link.

8. A saw in combination according to claim 7 in which the edge of the said intermediate link adjacent the twisted section is recessed on the side facing the said twisted section and has clearance from the said twisted section.

9. A saw chain in combination according to claim 7 in which said twisted section extends over the said intermediate link slightly in advance of the center of said intermediate link with respect to the cutting direction of the saw chain.

10. A saw chain in combination according to claim 1 in which each said cutting tooth link comprises a portion protruding outwardly from the saw chain in the plane of the respective link and forming depth limiting means for the respective cutting tooth link.

11. A saw chain in combination according to claim 1 which includes a lateral link in advance of each cutting tooth link with each said lateral link including a portion protruding outwardly in the plane of the respective link and forming a depth limiting element for the following cutting tooth link.

12. A saw chain in combination according to claim 11 in which the depth limiting means on each cutting tooth link is on the leading end thereof while the depth limiting element on the lateral link immediately preceding each cutting tooth link on the same side of the chain is at the trailing end of the respective lateral link.

* * * * *

UNITED STATES PATENT OFFICE
CERTIFICATE OF CORRECTION

Patent No. 3,921,490        Dated November 25, 1975

Inventor(s)  Hans Dolata et al.

It is certified that error appears in the above-identified patent and that said Letters Patent are hereby corrected as shown below:

-- [30]  Foreign Application Priority Data

Jan. 20, 1973        Germany------- P 23 02 779.4  --.

Signed and Sealed this

Twenty-first Day of September 1976

[SEAL]

Attest:

RUTH C. MASON
*Attesting Officer*

C. MARSHALL DANN
*Commissioner of Patents and Trademarks*